United States Patent
Yoshida et al.

(10) Patent No.: US 10,189,929 B2
(45) Date of Patent: Jan. 29, 2019

(54) ACTIVE-ENERGY-RAY-CURABLE COMPOSITION FOR OPTICAL MEMBERS, CURED ARTICLE, AND OPTICAL LENS AND SHEET OR FILM FOR OPTICAL LENSES EACH PRODUCED USING SAID CURED ARTICLE

(71) Applicant: SANYO CHEMICAL INDUSTRIES, LTD., Kyoto (JP)

(72) Inventors: Kazunori Yoshida, Kyoto (JP); Yu Sakai, Kyoto (JP); Keiichirou Inoue, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 34 days.

(21) Appl. No.: 14/759,999

(22) PCT Filed: Jan. 21, 2014

(86) PCT No.: PCT/JP2014/051108
§ 371 (c)(1),
(2) Date: Jul. 9, 2015

(87) PCT Pub. No.: WO2014/119425
PCT Pub. Date: Aug. 7, 2014

(65) Prior Publication Data
US 2015/0337066 A1  Nov. 26, 2015

(30) Foreign Application Priority Data

Jan. 31, 2013 (JP) .................................. 2013-017168
Oct. 29, 2013 (JP) .................................. 2013-224192

(51) Int. Cl.
| C08F 222/20 | (2006.01) |
| C08L 35/02 | (2006.01) |
| C08F 290/06 | (2006.01) |
| G02B 1/04 | (2006.01) |
| C08F 222/10 | (2006.01) |
| C09J 4/06 | (2006.01) |

(52) U.S. Cl.
CPC ...... *C08F 222/20* (2013.01); *C08F 222/1006* (2013.01); *C08F 290/06* (2013.01); *C08F 290/062* (2013.01); *C08L 35/02* (2013.01); *C09J 4/06* (2013.01); *G02B 1/041* (2013.01)

(58) Field of Classification Search
CPC ................ C08F 222/20; C08F 290/062; C08F 222/1006; C08F 290/06; C09J 4/06; G02B 1/041
See application file for complete search history.

(56) References Cited

U.S. PATENT DOCUMENTS

| 2006/0279679 | A1* | 12/2006 | Fujisawa | G02B 5/0221 349/116 |
| 2007/0298248 | A1* | 12/2007 | Hongo | C08J 7/047 428/333 |
| 2014/0120313 | A1* | 5/2014 | Uchida | C08F 220/28 428/141 |

FOREIGN PATENT DOCUMENTS

| JP | 5-214044 | 8/1993 |
| JP | 5-255462 | 10/1993 |
| JP | 7-70219 | 3/1995 |
| JP | 10-241206 | 9/1998 |
| JP | 2006-309248 | 11/2006 |
| JP | 2007-58111 | 3/2007 |
| JP | 2007-99989 | 4/2007 |
| JP | 2008-94987 | 4/2008 |
| JP | 2009-7568 | 1/2009 |
| JP | 2011-63698 | 3/2011 |
| JP | 2012-116923 | 6/2012 |
| JP | 2012-226040 | 11/2012 |
| JP | 2012-242464 | 12/2012 |
| JP | 2013-168522 | 8/2013 |
| JP | 2013-228729 | 11/2013 |
| TW | 201250386 | 12/2012 |
| WO | 2012/176906 | 12/2012 |
| WO | 2013/151119 | 10/2013 |

OTHER PUBLICATIONS

Naito et al, machine English translation of JP 2012-24264 (pub Oct. 12, 2012).*
International Search Report dated Apr. 22, 2014 in International (PCT) Application No. PCT/JP2014/051108.
Naito et al., machine English translation of JP 2012-242464, published Oct. 2012.

* cited by examiner

*Primary Examiner* — Jessica M Roswell
(74) *Attorney, Agent, or Firm* — Wenderoth, Lind & Ponack, L.L.P.

(57) ABSTRACT

An object of the present invention is to provide an active energy ray-curable composition capable of forming a cured product excellent in damage restoration, adhesion to a plastic base, and transparency after curing. An active energy ray-curable composition for optical components of the present invention essentially includes: a monomer (A) having 2 or more radical-polymerizable reactive groups (x1), a homopolymer of the monomer (A) having a glass transition temperature of higher than 200° C.; a monomer (C) having 2 or more radical-polymerizable reactive groups (x2), a homopolymer of the monomer (C) having a glass transition temperature of lower than −15° C.; and a photopolymerization initiator (E).

13 Claims, No Drawings

ACTIVE-ENERGY-RAY-CURABLE COMPOSITION FOR OPTICAL MEMBERS, CURED ARTICLE, AND OPTICAL LENS AND SHEET OR FILM FOR OPTICAL LENSES EACH PRODUCED USING SAID CURED ARTICLE

TECHNICAL FIELD

The present invention relates to an active energy ray-curable composition for optical components, a cured product thereof, and an optical component prepared from the cured product.

BACKGROUND ART

Prism sheets or diffusion sheets used in liquid crystal displays, or optical lenses such as Fresnel lenses or lenticular lenses used in projection TVs have conventionally been produced by injection molding or hot press molding of thermoplastic resins.

These production methods, however, have low productivity because they need a long heating time and a long cooling time during production. Further, in the production methods, optical lenses shrink by heating, and reproducibility of fine structures thereof is poor.

In order to solve these problems, a method is performed in which an active energy ray-curable composition is poured into a mold having a transparent resin base set on an inner surface of the mold, and cured by irradiation with active energy rays.

In recent years, optical lenses have been improved to increase their brightness with development of high brightness displays. For this purpose, a technique of molding high refractive index lenses with a high aromatic ring content has been examined (Patent Literature 1).

A high refractive index cured product prepared from an active energy ray-curable composition with a high aromatic ring content disclosed in Patent Literature 1 is however too rigid. Therefore, fine structures of a cured and molded optical lens are deformed or broken to be damaged, and further, the damaged portions are not restored even after a long period of time. As a result, optical properties such as transmissivity or brightness are problematically impaired.

Another problem is that a rigid optical lens with fine irregularities may damage other components when they are in contact with each other.

In order to solve such problems of a rigid cured product with fine irregularities which is likely to break or to damage other components, it has been suggested that an optical lens with a fine shape that is less likely to break is obtained by devising the shape itself of the optical lens (e.g. Patent Literature 2).

Further, there may be a method of reducing deformation of the shape of a lens for easy restoration of damaged portions. For example, a method for reducing the friction coefficient of a lens surface by adding a slip agent such as silicone oil has been suggested (e.g. Patent Literature 3).

CITATION LIST

Patent Literature

Patent Literature 1: JP 2008-094987 A
Patent Literature 2: JP 2006-309248 A
Patent Literature 3: JP H07-070219 A

SUMMARY OF INVENTION

Technical Problem

The method disclosed in Patent Literature 2, however, has a problem of insufficiency of ease of restoration of damaged portions (damage restoration) of a lens with fine irregularities.

Further, although in the method disclosed in Patent Literature 3, damage restoration is improved, a slip agent bleeds out, resulting in poor adhesion and poor transparency of an optical lens.

For this reason, the present invention aims to provide an active energy ray-curable composition capable of forming a cured product excellent in damage restoration, adhesion to a plastic base, and transparency after curing.

Solution to Problem

As a result of examination for achieving the above object, the present inventors have reached the present invention.

That is, the present invention relates to an active energy ray-curable composition for optical components, the composition including as essential components: a monomer (A) having 2 or more radical-polymerizable reactive groups (x1), a homopolymer of the monomer (A) having a glass transition temperature of higher than 200° C.; a monomer (C) having 2 or more radical-polymerizable reactive groups (x2), a homopolymer of the monomer (C) having a glass transition temperature of lower than −15° C.; and a photo-polymerization initiator (E). The present invention relates to a cured product prepared by curing the active energy ray-curable composition for optical components by irradiation with active energy rays; and an optical lens, a sheet for optical lenses, or a film for optical lenses, including the cured product.

Advantageous Effects of Invention

The active energy ray-curable composition for optical components of the present invention is excellent in damage restoration. In addition, the composition forms a cured product excellent in adhesion to a plastic base and transparency after curing.

DESCRIPTION OF EMBODIMENTS

The terms "(meth)acrylate" and "(meth)acryloyl group" herein mean "acrylate or methacrylate" and "acryloyl group or methacryloyl group", respectively.

The phrase "n- or higher functional (n is an integer of 2 or more)" means that the number of radical-polymerizable reactive groups (x) is n or more. Hereinafter, the similar expressions are applied.

The active energy ray-curable composition for optical components of the present invention containing, as polymerizable monomers, a monomer (A) having 2 or more radical-polymerizable reactive groups (x1), a homopolymer of the monomer (A) having a glass transition temperature of higher than 200° C., and a monomer (C) having 2 or more radical-polymerizable reactive groups (x2), a homopolymer of the monomer (C) having a glass transition temperature of lower than −15° C., in combination, and optionally containing a slip agent (D), can form a cured product excellent in adhesion to a plastic base and transparency after curing.

The monomer (A) having 2 or more radical-polymerizable reactive groups (x1) is the first essential component of the active energy ray-curable composition for optical components of the present invention, and in order to obtain transparency, the homopolymer of the monomer (A) has a glass transition temperature of higher than 200° C. As the monomer (A), a monomer whose homopolymer has a glass transition temperature of 201° C. or higher or no glass transition temperature is preferred, and a monomer whose homopolymer has a glass transition temperature of 230° C. or higher or no glass transition temperature is more preferred.

Here, "the glass transition temperature of the homopolymer of a monomer" is a temperature at which loss tangent (tan δ) in measurement of the dynamic viscoelasticity of a cured product prepared through simple polymerization of the monomer shows the maximum value.

<Preparation of Test Piece>

To a monomer is added 1-hydroxycyclohexylphenyl ketone (trade name "IRGACURE 184", produced by BASF), for example, as an initiator in an amount of 3% by weight based on the amount of the monomer, and the monomer is cured by irradiation with 1000 mJ/cm$^2$ of ultraviolet light using an ultraviolet irradiation apparatus. Thus, a test piece with a size of 40 mm in length, 5 mm in width, and 1 mm in thickness is prepared.

<Method of Measuring Dynamic Viscoelasticity>

Measurement is performed using the test piece by a dynamic viscoelasticity measurement apparatus (e.g. Rheogel-E4000, produced by UBM) under the conditions of frequency: 10 Hz, temperature rise rate: 4° C./rain.

The chemical structure of the monomer (A) having 2 or more radical-polymerizable reactive groups (x1) is not particularly limited, as long as the homopolymer thereof has a glass transition temperature in the above range. A monomer (A1) having 2 to 6, preferably 4 to 6 radical-polymerizable reactive groups (x1) in a molecule, and 0 to 5 oxyalkylene groups in a molecule is preferred.

The radical-polymerizable reactive group (x1) is preferably at least one group selected from the group consisting of an acrylate group, a methacrylate group, a vinyloxy group, propenyloxy group, and an allyloxy group, more preferably an acrylate group or a methacrylate group, still more preferably an acrylate group.

The oxyalkylene group has preferably 2 to 4 carbon atoms, more preferably 2 to 3 carbon atoms.

Specific examples thereof include an oxyethylene group and an oxypropylene group.

The same shall apply to oxyalkylene groups described below.

Specific examples of a monomer (A11) having 2 radical-polymerizable reactive groups (x1) include bisphenoxyfluorene diacrylate.

Specific examples of a monomer (A12) having 3 radical-polymerizable reactive groups (x1) include trimethylolpropane tri(meth)acrylate, tris(2-hydroxyethyl)isocyanurate tri(meth)acrylate, pentaerythritol tri(meth)acrylate, trimethylolpropane trivinyl ether, and pentaerythritol trivinyl ether. Among these, trimethylolpropane tri(meth)acrylate is preferred.

Specific examples of a monomer (A13) having 4 radical-polymerizable reactive groups (x1) include tetra(meth)acrylates of pentaerythritol, an ethylene oxide (hereinafter, abbreviated as EO) (2 mol) adduct of pentaerythritol, an EO (4 mol) adduct of pentaerythritol, an EO (4 mol) adduct of ditrimethylolpropane, and an EO (4 mol) adduct of dipentaerythritol; and pentaerythritol tetravinyl ether. Among these, pentaerythritol tetra(meth)acrylate and a tetra(meth)acrylate of an EO (2 mol) adduct of pentaerythritol are preferred.

Specific examples of a monomer (A14) having 5 radical-polymerizable reactive groups (x1) include penta(meth)acrylates of dipentaerythritol, an EO (2 mol) adduct of dipentaerythritol, and an EO (4 mol) adduct of dipentaerythritol; and dipentaerythritol pentavinyl ether. Among these, dipentaerythritol penta(meth)acrylate and a penta(meth)acrylate of an EO (2 mol) adduct of dipentaerythritol are preferred.

Specific examples of a monomer (A15) having 6 radical-polymerizable reactive groups (x1) include hexa(meth)acrylates of dipentaerythritol, an EO (2 mol) adduct of dipentaerythritol, and an EO (4 mol) adduct of dipentaerythritol; and dipentaerythritol hexavinyl ether. Among these, dipentaerythritol hexa(meth)acrylate and a hexa(meth)acrylate of an EO (2 mol) adduct of dipentaerythritol are preferred.

Among these monomers (A1), dipentaerythritol hexa(meth)acrylate, dipentaerythritol penta(meth)acrylate, and pentaerythritol tetra(meth)acrylate are more preferred.

In terms of damage restoration and transparency, the active energy ray-curable composition of the present invention contains the monomer (A) having 2 or more radical-polymerizable reactive groups (x1) in an amount of preferably 3% to 50% by weight, more preferably 10% to 50% by weight, of the total weight of the monomer (A) and the monomer (C) that has 2 or more radical-polymerizable reactive groups (x2), a homopolymer of the monomer (C) having a glass transition temperature of lower than −15° C.

The monomer (C) having 2 or more radical-polymerizable reactive groups (x2) is the second essential component of the active energy ray-curable composition for optical components of the present invention, and the homopolymer of the monomer (C) has a glass transition temperature of lower than −15° C., preferably −50° C. to −20° C., in terms of damage restoration.

The chemical structure of the monomer (C) having 2 or more radical-polymerizable reactive groups (x2) is not particularly limited, as long as the homopolymer thereof has a glass transition temperature in the above range. A monomer (C1) having 2 to 6 radical-polymerizable reactive groups (x2) in a molecule and 6 to 40 oxyalkylene groups in a molecule is preferred.

The radical-polymerizable reactive group (x2) is preferably at least one group selected from the group consisting of an acrylate group, a methacrylate group, a vinyloxy group, a propenyloxy group, and an allyloxy group, more preferably an acrylate group or methacrylate group, still more preferably an acrylate group.

The monomer having a vinyloxy group as the group (x2) is, for example, polyethylene glycol divinyl ether.

Examples of the monomer (C1) having 2 to 6 radical-polymerizable reactive groups (x2) in a molecule and 6 to 40 oxyalkylene groups in a molecule include a monomer (C11) having 2 groups (x2), a monomer (C12) having 3 groups (x2), a monomer (C13) having 4 groups (x2), a monomer (C14) having 5 groups (x2), and a monomer (C15) having 6 groups (x2), which are listed below.

Specific examples of the monomer (C11) include monomers (C111) and (C112) listed below.

Di(Meth)Acrylate of Polyalkylene Glycol (C111)

Examples thereof include a di(meth)acrylate of polyethylene glycol, a di(meth)acrylate of polypropylene glycol, and a di(meth)acrylate of polytetramethylene glycol.

Di(Meth)Acrylate of Alkylene Oxide (6 to 40 Mol) Adduct of Dihydric Phenol Compound (C112)

Examples thereof include a di(meth)acrylate of an alkylene oxide adduct of a dihydric phenol compound (monocyclic phenols (e.g. catechol, resorcinol, hydroquinone), condensed polycyclic phenols (e.g. dihydroxy naphthalene), bisphenol compounds (e.g. bisphenols A, —F, and —S)). Specific examples include a di(meth)acrylate of an EO (8 mol) adduct of catechol, a di(meth)acrylate of a propylene oxide (hereinafter, abbreviated as PO) (10 mol) adduct of dihydroxy naphthalene, a di(meth)acrylate of an EO (10 mol) adduct of bisphenol A, and a di(meth)acrylate of an EO (20 mol) adduct of bisphenol A.

Specific examples of the monomer (C12) include tri (meth)acrylates of an EO (6 mol) adduct of trimethylolpropane, an EO (9 mol) adduct of trimethylolpropane, an EO (15 mol) adduct of trimethylolpropane, an EO (20 mol) adduct of trimethylolpropane, a PO (9 mol) adduct of trimethylolpropane, an EO (6 mol) and PO (3 mol) adduct of glycerin, and an EO (6 mol) adduct of pentaerythritol; and trivinyl ethers of an EO (6 mol) adduct of trimethylolpropane, an EO (9 mol) adduct of trimethylolpropane, an EO (15 mol) adduct of trimethylolpropane, an EO (20 mol) adduct of trimethylolpropane, a PO (9 mol) adduct of trimethylolpropane, an EO (6 mol) and PO (3 mol) adduct of glycerin, and an EO (6 mol) adduct of pentaerythritol.

Specific examples of the monomer (C13) include tetra (meth)acrylates of an EO (10 mol) adduct of pentaerythritol, an EO (20 mol) adduct of pentaerythritol, an EO (35 mol) adduct of pentaerythritol, an EO (10 mol) adduct of ditrimethylolpropane, and an EO (10 mol) adduct of dipentaerythritol; and tetravinyl ethers of an EO (10 mol) adduct of pentaerythritol, an EO (20 mol) adduct of pentaerythritol, an EO (35 mol) adduct of pentaerythritol, an EO (10 mol) adduct of ditrimethylolpropane, and an EO (10 mol) adduct of dipentaerythritol.

Specific examples of the monomer (C14) include penta (meth)acrylates of an EO (10 mol) adduct of dipentaerythritol and an EO (15 mol) adduct of dipentaerythritol; and pentavinyl ethers of an EO (10 mol) adduct of dipentaerythritol and an EO (15 mol) adduct of dipentaerythritol.

Specific examples of the monomer (C15) include hexa (meth)acrylates of an EO (10 mol) adduct of dipentaerythritol and an EO (15 mol) adduct of dipentaerythritol; and hexavinyl ethers of an EO (10 mol) adduct of dipentaerythritol and an EO (15 mol) adduct of dipentaerythritol.

The monomer (C) is desirably a polyfunctional (meth) acrylate represented by the following formula (1):

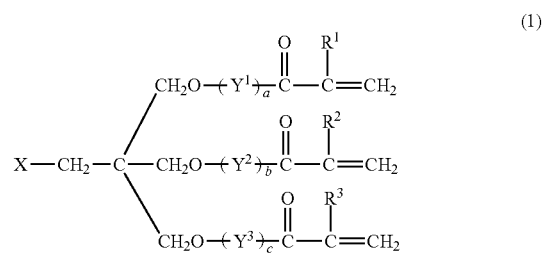

wherein X represents a hydroxyl group, a methyl group, a (meth)acryloyloxy group, a group represented by the formula (2), or a group represented by the formula (3):

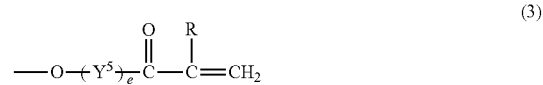

$R^1$ to $R^3$ and R each represent a hydrogen atom or a methyl group and may be the same as or different from one another, $Y^1$ to $Y^5$ each represent a C2-C4 oxyalkylene group and may be the same as or different from one another, and a, b, c, d, and e independently represent an integer of 0 to 10, provided that a+b+c+d+e is 6 to 40.

The polyfunctional (meth)acrylate represented by the formula (1) includes monomers satisfying the formula (1) among the monomers listed as an example of the monomer (C1).

The monomer (C) is desirably a bifunctional (meth) acrylate represented by the following formula (4):

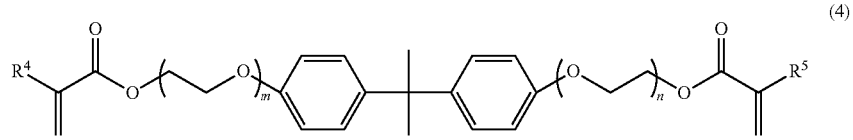

wherein R⁴ and R⁵ independently represent a hydrogen atom or a methyl group, and m and n independently represent an integer of 3 to 10.

The bifunctional (meth)acrylate represented by the formula (4) includes monomers satisfying the formula (4) among the monomers listed as an example of the monomer (C1).

In terms of damage restoration and transparency, the active energy ray-curable composition of the present invention contains the monomer (C) in an amount of preferably 50% to 97% by weight, more preferably 60% to 90% by weight, still more preferably 30% to 80% by weight, of the total weight of the monomers (A) and (C).

Examples of the photopolymerization initiator (E), which is the third essential component of the active energy ray-curable composition for optical components of the present invention, include a phosphine oxide compound (E1), a benzoylformate compound (E2), a thioxanthone compound (E3), an oxime ester compound (E4), a hydroxy benzoyl compound (E5), a benzophenone compound (E6), a ketal compound (E7), and a 1,3-α-aminoalkylphenone compound (E8).

Examples of the phosphine oxide compound (E1) include bis(2,4,6-trimethylbenzoyl)-phenylphosphine oxide and 2,4,6-trimethylbenzoyldiphenylphosphine oxide.

Examples of the benzoylformate compound (E2) include methylbenzoylformate.

Examples of the thioxanthone compound (E3) include isopropylthioxanthone.

Examples of the oxime ester compound (E4) include 1,2-octanedion, 1-[4-(phenylthio)-, 2-(O-benzoyloxime)]; and ethanone, 1-[9-ethyl-6-(2-methylbenzoyl)-9H-carbazole-3-yl]-, 1-(O-acetyloxime).

Examples of the hydroxy benzoyl compound (E5) include 2-hydroxy-2-methyl-1-phenylpropane-1-one, 1-hydroxycyclohexylphenyl ketone, benzoin alkyl ether, and 2-hydroxy-1-{4-[4-(2-hydroxy-2-methyl-propionyl)-benzyl]-phenyl}-2-methyl-propane-1-one.

Examples of the benzophenone compound (E6) include benzophenone.

Examples of the ketal compound (57) include benzyl dimethyl ketal.

Examples of the 1,3-α-aminoalkylphenone compound (E8) include 2-methyl-1-(4-methylthiophenyl)-2-morpholinopropane-1-one and 2-(dimethylamino)-2-[(4-methylphenyl)methyl]-1-[4-(4-morpholinyl)phenyl]-1-butanone.

In recent years, triacetyl cellulose has been often used as a transparent plastic base material in terms of transparency.

Triacetyl cellulose base usually contains a plasticizer or an ultraviolet absorber for its flexibility and resistance to yellowing. Because an ultraviolet absorber is contained, the active energy ray-curable resin is difficult to be cured by irradiation with ultraviolet light of 400 nm or less in the above-mentioned molding process.

Therefore, a lamp with an emission line in a visible light region of 400 nm or more, for example, a V valve produced by Fusion UV Systems, has been recently used in the molding process.

The photopolymerization initiator (E) preferably has an absorption wavelength in the range of 400 nm or more, and more preferably has an absorption wavelength in the range of 400 to 450 nm.

Among such photopolymerization initiators (E), the phosphine oxide compound (E1) is preferred, and bis(2,4,6-trimethylbenzoyl)-phenylphosphine oxide and 2,4,6-trimethylbenzoyldiphenylphosphine oxide are more preferred, in terms of curability and discoloration-prevention of a cured product in the visible light region of 400 nm or more.

The active energy ray-curable composition of the present invention contains the photopolymerization initiator (E) in an amount of preferably 0.5% to 10% by weight, more preferably 0.8% to 9% by weight, still more preferably 1% to 8% by weight, based on the total weight of the monomers (A) and (C).

It is preferred that when the amount of the initiator (E) is 0.5% by weight or more, the composition has favorable photocuring reactivity, and when the amount of the initiator (E) is 10% by weight or less, the glass transition temperature of a cured product cured by irradiation with active energy rays does not decrease.

The active energy ray-curable composition of the present invention may further contain a monomer (B) having 2 or more radical-polymerizable reactive groups (x3), a homopolymer of the monomer (B) having a glass transition temperature of −15° C. or higher and 100° C. or lower.

The homopolymer of the monomer (B) having 2 or more radical-polymerizable reactive groups (x3) has a glass transition temperature of −15° C. to 100° C., preferably −12° C. to 70° C., more preferably −10° C. to 30° C., in terms of damage restoration and transparency.

The radical-polymerizable reactive group (x3) is preferably at least one group selected from the group consisting of an acrylate group, a methacrylate group, a vinyloxy group, a propenyloxy group, and an allyloxy group, more preferably an acrylate group or methacrylate group, still more preferably an acrylate group.

The chemical structure of the monomer (B) having 2 or more radical-polymerizable reactive groups (x3) is not particularly limited, as long as the homopolymer thereof has a glass transition temperature in the above range. A monomer (B1) having 2 to 6 radical-polymerizable reactive groups (x3) in a molecule and 1 to 15 organic groups (b) represented by the formula (5) in a molecule is preferred.

In the formula (5), p represents 4 or 5.

Examples of the monomer (B1) in a molecule include a monomer (B11) having 4 groups (x3), a monomer (B12) having 5 groups (x3), and a monomer (B13) having 6 groups (x3), which are listed below.

The monomer (B1) is produced by addition reaction of ε-caprolactone to a polyhydric alcohol having 2 to 6 hydroxyl groups in cases where p in the organic group (b) represented by the formula (5) is 5, or addition reaction of δ-valerolactone to a polyhydric alcohol having 2 to 6 hydroxyl groups in cases where p in the organic group (b) represented by the formula (5) is 4; and (meth)acryloylation (esterification) of the resulting adduct with acrylic acid or methacrylic acid, or addition of the resulting adduct to acetylene in the presence of an alkali metal alcoholate catalyst.

The monomer (B11) may be a compound prepared by ring-opening addition of 1 to 15 mol of ε-caprolactone or δ-valerolactone to a tetrahydric alcohol; and esterification of the resulting adduct with (meth)acrylic acid, or addition of the resulting adduct to acetylene in the presence of an alkali metal alcoholate catalyst. Specific examples of the compound include a tetra(meth)acrylate of a δ-valerolactone (4 mol) adduct of pentaerythritol and tetravinyl ether of a δ-valerolactone (4 mol) adduct of pentaerythritol.

The monomer (B12) may be a compound prepared by ring-opening addition of 1 to 15 mol of ε-caprolactone or δ-valerolactone to a pentahydric alcohol; and esterification of the resulting adduct with (meth)acrylic acid, or addition of the resulting adduct to acetylene in the presence of an alkali metal alcoholate catalyst. Specific examples of the compound include a penta(meth)acrylate of a ε-caprolactone (6 mol) adduct of dipentaerythritol and pentavinyl ether of a ε-caprolactone (6 mol) adduct of dipentaerythritol.

The monomer (B13) may be a compound prepared by ring-opening addition of 1 to 15 mol of ε-caprolactone or δ-valerolactone to a hexahydric alcohol; and esterification of the resulting adduct with (meth)acrylic acid, or addition of the resulting adduct to acetylene in the presence of an alkali metal alcoholate catalyst. Specific examples of the compound include a hexa(meth)acrylate of a ε-caprolactone (6 mol) adduct of dipentaerythritol, a hexa(meth)acrylate of a ε-caprolactone (12 mol) adduct of dipentaerythritol, and hexavinyl ether of a ε-caprolactone (6 or 12 mol) adduct of dipentaerythritol.

In cases where the active energy ray-curable composition of the present invention contains the monomer (B), the amount of the monomer (B) is preferably 5% to 40% by weight, more preferably 8% to 30% by weight, still more preferably 10% to 25% by weight, of the total weight of the monomers (A), (B), and (C), in terms of damage restoration and adhesion.

The active energy ray-curable composition for optical components of the present invention is cured by irradiation with active energy rays. The resulting cured product has a glass transition temperature of preferably −50° C. to 80° C., more preferably −40° C. to 75° C., still more preferably −40° C. to 70° C., particularly preferably −40° C. to 60° C. A cured product with a glass transition temperature of −50° C. or higher has more favorable transparency, and a cured product with a glass transition temperature of 80° C. or lower has greater damage restoration.

The active energy ray-curable composition for optical components of the present invention preferably further contains a slip agent (D). Examples of the slip agent include a silicon-based slip agent (D1) and a fluorine-based slip agent (D2). The slip agent (D) may have a radical-polymerizable reactive group.

The slip agent (D) is preferably compatible with the monomer (A) and the monomer (C) used in the present invention. The compatibility can be represented by a solubility parameter (SP) as an indicator thereof. The solubility parameter of the slip agent (D) is preferably 8.0 to 9.0, more preferably 8.1 to 8.8.

The solubility parameter (SP) value is calculated by the following equation.

$$SP=(\Delta H/V)^{1/2}$$

In the formula, $\Delta H$ represents a molar heat of vaporization (cal/mol), and V represents a molar volume (cm$^3$/mol). Further, a total ($\Delta H$) of molar heats of vaporization ($\Delta ei$) of atomic groups and a total (V) of molar volumes ($\Delta vi$) of atomic groups, which are all disclosed in "POLYMER ENGINEERING AND SCIENCE, February, 1974, Vol. 14, No. 2, Robert F. Fedors. (pp. 147 to 154)", can be used as $\Delta H$ and V, respectively.

The slip agent (D) preferably has 2 to 100 oxyalkylene groups in a molecule.

The slip agent (D) having 2 or more oxyalkylene groups is favorably compatible with other materials composing the active energy ray-curable composition. Use of the slip agent (D) having 100 or less oxyalkylene groups preferably reduces the dynamic friction coefficient of the cured product.

The silicon-based slip agent (D1) may be, for example, a polyether-modified polydialkyl siloxane. Examples thereof include polydialkyl siloxane (D11) with a terminal modified with an alkylene oxide, polydialkyl siloxane (D12) with a side chain modified with an alkylene oxide, and mixtures of two or more of these. The siloxanes (D11) and (D12) may further contain a radical-polymerizable reactive group.

Examples of the siloxane (D11) include a polydimethyl siloxane having a terminal modified with EO, a polydimethyl siloxane having a terminal modified with EO and PO, a polydiethyl siloxane having a terminal modified with EO, and (meth)acrylates of these.

Examples of the siloxane (D12) include a polydimethyl siloxane having a side chain modified with PO, a polydimethyl siloxane having a side chain modified with EO and butylene oxide, a polydimethyl siloxane having a side chain modified with EO and PO, and (meth)acrylates of these.

Among these polyether-modified polydialkyl siloxanes, the siloxane (D12) is preferred in terms of damage restoration. A polydimethyl siloxane having a side chain modified with EO and PO is more preferred.

The fluorine-based slip agent (D2) may be, for example, a perfluoroalkyl ethylene oxide adduct. Examples thereof include a perfluoro compound (D21) having a terminal modified with an alkylene oxide, a perfluoro compound (D22) having a side chain modified with an alkylene oxide, and mixtures of two or more of these. The perfluoro compounds (D21) and (D22) may further contain a radical-polymerizable reactive group, and may be a fluoro group-containing acryloyl-modified oligomer.

The number average molecular weight (Mn) of the slip agent (D) is preferably in the range of 300 to 50,000.

The slip agent (D) with a Mn of 300 or more imparts favorable adhesion with a plastic base. The slip agent (D) with a Mn of 50,000 or less imparts favorable compatibility with a resin.

The amount of the slip agent (D) in the active energy ray-curable composition for optical components of the present invention is preferably 0.5% to 10% by weight, more preferably 0.8% to 5% by weight, based on the total weight of the monomers (A) and (C). When the amount of the slip agent (D) is 0.5% by weight or more, the cured product thereof has more favorable damage restoration and can show inherent performance of the cured product. When the amount of the slip agent (D) is 10% by weight or less, greater adhesion to a plastic film is obtained.

The active energy ray-curable composition for optical components of the present invention may contain a mono (meth)acrylate (F).

Examples of the mono(meth)acrylate (F) include the following acrylates (F1) to (F4).

(Meth)Acrylate (F1) of (Aliphatic, Alicyclic, or Araliphatic) Monohydric Alcohol Examples thereof include lauryl(meth)acrylate, stearyl (meth)acrylate, cyclohexyl(meth)acrylate, isobornyl(meth) acrylate, benzyl(meth)acrylate, phenylethyl(meth)acrylate, a mono(meth)acrylate of o-, m-, or p-phenylphenol, a mono (meth)acrylate of 3,3'-diphenyl-4,4'-dihydroxybiphenyl, and a mono(meth)acrylate of styrenated phenol containing 2.5 mol of styrene added to phenol.

(Meth)Acrylate (F2) of Alkylene Oxide Adduct of Monohydric Alcohol

Examples thereof include (meth)acrylates of alkylene oxide adducts of monohydric alcohols used in the (meth)

acrylates (F1), such as a (meth)acrylate of an EO (2 mol) adduct of lauryl alcohol or a (meth)acrylate of a PO (3 mol) adduct of lauryl alcohol.

(Meth)Acrylate (F3) of Alkylene Oxide Adduct of Alkylphenol

Examples thereof include a (meth)acrylate of an EO (1 mol) adduct of phenol, a (meth)acrylate of an EO (2 mol) adduct of phenol, a (meth)acrylate of an EO (1 mol) adduct of tribromophenol, a (meth)acrylate of an EO (1 mol) adduct of nonylphenol, a mono(meth)acrylate of an alkylene oxide adduct of o-, m-, or p-phenylphenol, a mono(meth)acrylate of an alkylene oxide adduct of 3,3'-diphenyl-4,4'-dihydroxybiphenyl, a mono(meth)acrylate of an alkylene oxide adduct of styrenated phenol containing 2.5 mol styrene added to phenol, and a mono(meth)acrylate of an alkylene oxide adduct of styrenated phenol containing 3 mol of styrene added to phenol.

Acrylamide and Acryloylmorpholine (F4)

Examples thereof include dimethylacrylamide, diethylacrylamide, hydroxyethylacrylamide, and acryloylmorpholine.

The active energy ray-curable composition for optical components of the present invention may further contain an antistatic agent (G).

Examples of the antistatic agent (G) include the following compounds (G1) to (G3).

Tertiary Amine Salt Compound (G1) Free from a Cyclic Structure

Examples thereof include a salt of triethylamine and dodecylbenzenesulfonic acid, a salt of dimethylstearylamine and paratoluenesulfonic acid, and a salt of dimethylaminoethyl acrylate and dodecylbenzenesulfonic acid.

Cyclic Amidine Salt Compound (G2)

Examples thereof include a salt of dodecylbenzenesulfonic acid and 1,8-diazabicyclo (5,4,0)-undecene-7, a salt of dodecylbenzenesulfonic acid and 1-methyl-3-ethylimidazole, and a salt of benzoic acid and 1,5-diazabicyclo (4,3,0)-nonene-5.

Organic Lithium Salt Compound (G3)

Examples thereof include a lithium salt of paratoluenesulfonic acid, a lithium salt of trifluoromethanesulfonic acid, a lithium salt of trifluoromethanesulfonyl imide, and a polymer-lithium salt.

The active energy ray-curable composition for optical components of the present invention may contain various additives, if necessary, as long as they do not inhibit the effects of the present invention.

Examples of the additives include a plasticizer, an organic solvent, a dispersant, a defoaming agent, a thixotropy imparting agent (thickener), an antioxidant, a hindered amine light stabilizer, and an ultraviolet absorber.

The active energy ray-curable composition for optical components of the present invention may further contain various solvents to control the viscosity during application, as long as they do not inhibit the effects of the present invention.

Examples of the solvents include methyl ethyl ketone, ethyl acetate, methyl isobutyl ketone, isopropanol, toluene, and methanol.

A molded body including the active energy ray-curable composition for optical components of the present invention may be produced by any method, and for example, produced by the following application method and molding method. Specifically, the temperature of the composition of the present invention is preliminarily controlled in the range of 20° C. to 50° C.; the composition is applied to a metal mold (or a metal mold is filled with the composition) (the temperature of the mold is usually 20° C. to 50° C., preferably 25° C. to 40° C.) with the shape of a molded body to be obtained (for example, the shape of an optical lens) using a dispenser or the like so as to obtain a coating with a thickness of 50 to 150 µm after curing; a transparent base (including transparent film) is pressure laminated on the coating with keeping air from entering therebetween; further the coating is cured by exposing the transparent base to the below described active energy rays; and the cured coating is released from the mold to give a molded body (lens sheet).

The transparent base (including transparent film) may include a resin such as methyl methacrylate (co)polymer, polyethylene terephthalate, polycarbonate, polytriacetyl cellulose, or polycycloolefin.

The active energy rays in the present invention include ultraviolet light, electron beams, X-rays, infrared rays, and visible light. Among these active energy rays, ultraviolet light and electron beams are preferred in terms of curability and resin degradation.

In cases where the active energy ray-curable composition for optical components of the present invention is cured by ultraviolet light, various ultraviolet irradiation devices (for example, ultraviolet irradiation device, model No. "VPS/I600", produced by Fusion UV Systems) may be used. A lamp used may be, for example, a high pressure mercury lamp or metal halide lamp. The amount of UV irradiation (mJ/cm$^2$) is preferably 10 to 10,000, more preferably 100 to 5,000, in terms of curability of the composition and flexibility of the cured product.

The dynamic friction coefficient of the cured product of the active energy ray-curable composition for optical components of the present invention is preferably 0.05 to 0.5, more preferably 0.07 to 0.4, particularly preferably 0.08 to 0.3, in terms of damage restoration.

The dynamic friction coefficient is measured in accordance with the method described below.

The loss modulus E" of the cured product of the active energy ray-curable composition for optical components of the present invention is preferably $5 \times 10^7$ Pa or lower, more preferably $1 \times 10^7$ Pa or lower, in terms of damage restoration.

The loss modulus E" is measured in accordance with the method described below.

The cured product of the active energy ray-curable composition for optical components of the present invention can preferably be used as an optical lens, a sheet for optical lenses, or a film for optical lenses.

EXAMPLE

The following will further describe the present invention based on Examples and Comparative Examples, but the present invention is not limited thereto. Hereinafter, the symbol "%" refers to "% by weight" and the term "part(s)" refers to "part(s) by weight", if not otherwise specified.

Examples 1 to 19 and Comparative Examples 1 to 3

The ingredients shown in Table 1 were collectively blended in accordance with the amounts shown in Table 1, and were mixed by stirring using a disperser to give uniform mixtures. Thus, active energy ray-curable compositions of Examples 1 to 19 and Comparative Examples 1 to 3 were obtained.

TABLE 1

| | | | Tg (° C.) | Example | | | | | | | |
|---|---|---|---|---|---|---|---|---|---|---|---|
| | | | | 1 | 2 | 3 | 4 | 5 | 6 | 7 | 8 |
| Amount (part by weight) | Monomer (A) | Dipentaerythritol hexaacrylate (A-1) | 200 or more | 40 | | 40 | 35 | | 15 | | 19 |
| | | Pentaerythritol tetraacrylate (A-2) | 200 or more | | 35 | | | 50 | | 18 | |
| | | Trimethylolpropane triacrylate (A-3) | 200 or more | | | | | | | | |
| | | Bisphenoxyfluorene diacrylate (A-4) | 211 | | | | | | | | |
| | | Trimethylolpropane trivinyl ether (A-5) | 200 or more | | | | | | | | |
| | Monomer (C) | Polyethylene glycol diacrylate (C-1) | −20 | 50 | | | | | | 52 | |
| | | Triacrylate of EO (15 mol) adduct of trimethylolpropane (C-2) | −22 | | | 40 | 50 | | 85 | 30 | 40 |
| | | Diacrylate of EO (20 mol) adduct of bisphenol A (C-3) | −30 | | 50 | | | 35 | | | 41 |
| | | Tetraacrylate of EO (35 mol) adduct of pentaerythritol (C-4) | −30 | | | | | | | | |
| | | Triacrylate of EO (9 mol) adduct of trimethylolpropane (C-5) | −20 | | | | | | | | |
| | | Diacrylate of EO (10 mol) adduct of bisphenol A (C-6) | −20 | | | | | | | | |
| | | Polyethylene glycol divinyl ether (C-7) | −25 | | | | | | | | |
| | Photopolymerization initiator (E) | 2,4,6-trimethyl benzoyl diphenylphosphine oxide (E-1) | | 1 | 1 | | 1.5 | | 1 | 1 | |
| | | Bis(2,4,6-trimethyl benzoyl) phenylphosphine oxide (E-2) | | 1 | | 1 | 0.8 | 1 | 1 | | 1 |
| | | 1-hydroxycyclohexylphenyl ketone (E-3) | | | | | 1 | | | | 1 |
| | | 2-hydroxy-1-[4-[4-(2-hydroxy-2-methyl-propionyl)-benzyl]-phenyl]-2-methyl-propane-1-one (E-4) | | | | | | | | | |
| | Slip agent (D) | Polyether-modified polydimethyl siloxane (D1-1) | | 1 | | 1 | 1.5 | | 1 | 1.5 | 1 |
| | | Polyether-modified polydimethyl siloxane (D1-2) | | | 1 | | | | | | |
| | | Acrylate of polyether-modified polydimethyl siloxane (D1-3) | | | | | | 1 | | | |
| | | Perfluoroalkyl ethylene oxide adduct (D2-1) | | | | | | | | | |
| | | Fluoro group-containing acryloyl-modified oligomer (D2-2) | | | | | | | | | |
| | Monomer (B) | Hexaacrylate of ε-caprolactone (12 mol) adduct of dipentaerythritol (B-1) | 26 | 10 | 15 | 20 | 15 | 15 | | | |
| | Antistatic agent (G) | Lithium salt of trifluoro methanesulfonyl imide (G-1) | | | 1 | 1 | | 1 | 1 | | 1 |
| | | Polymer-lithium salt (G-2) | | | | | | 1 | | | |
| | | Polymer-lithium salt (G-3) | | | | | | | | 1 | |
| | Comparative monomer | Dicyclopentadiene diacrylate (C'-1) | 200 | | | | | | | | |
| Performance evaluation | | Dynamic friction coefficient | | 0.31 | 0.25 | 0.30 | 0.30 | 0.33 | 0.31 | 0.30 | 0.31 |
| | | Loss modulus E" (Pa) | | 5 × 10$^7$ | 4 × 10$^7$ | 5 × 10$^7$ | 4 × 10$^7$ | 5 × 10$^7$ | 2 × 10$^7$ | 2 × 10$^7$ | 2 × 10$^7$ |
| | | Damage restoration | | ○ | ○ | ○ | ○ | ○ | ○ | ○ | ○ |
| | | Adhesion | | ○ | ○ | ○ | ○ | ○ | ○ | ○ | ○ |
| | | Transparency | | 0.4 | 0.3 | 0.4 | 0.3 | 0.4 | 0.4 | 0.3 | 0.3 |

| | | | Tg (° C.) | Example | | | | | | | |
|---|---|---|---|---|---|---|---|---|---|---|---|
| | | | | 9 | 10 | 11 | 12 | 13 | 14 | 15 | 16 |
| Amount (part by weight) | Monomer (A) | Dipentaerythritol hexaacrylate (A-1) | 200 or more | 9 | | 19 | | | | 10 | |
| | | Pentaerythritol tetraacrylate (A-2) | 200 or more | | | | | 15 | 19 | | |

TABLE 1-continued

| | | Tg | | | | | | | | |
|---|---|---|---|---|---|---|---|---|---|---|
| Monomer (C) | Trimethylolpropane triacrylate(A-3) | 200 or more | | 30 | | 40 | | | | |
| | Bisphenoxyfluorene diacrylate (A-4) | 211 | | | | | | | | 40 |
| | Trimethylolpropane trivinyl ether (A-5) | 200 or more | | | | | | | | |
| | Polyethylene glycol diacrylate (C-1) | −20 | | 55 | | | | | | |
| | Triacrylate of EO (15 mol) adduct of trimethylolpropane (C-2) | −22 | 50 | 15 | | | | | 40 | |
| | Diacrylate of EO (20 mol) adduct of bisphenol A (C-3) | −30 | 41 | | | 30 | | | | 40 |
| | Tetraacrylate of EO (35 mol) adduct of pentaerythritol (C-4) | −30 | | | 81 | 30 | 50 | 20 | | 20 |
| | Triacrylate of EO (9 mol) adduct of trimethylolpropane (C-5) | −20 | | | 30 | | 31 | | | |
| | Diacrylate of EO (10 mol) adduct of bisphenol A (C-6) | −20 | | | 55 | | | 30 | | |
| | Polyethylene glycol divinyl ether (C-7) | −25 | | | | | | | | |
| Photopolymerization initiator (E) | 2,4,6-trimethyl benzoyl diphenylphosphine oxide (E-1) | | | | 1 | | 1 | | | |
| | Bis(2,4,6-trimethyl benzoyl) phenylphosphine oxide (E-2) | | 1 | | | 1 | 1 | | 1 | 1 |
| | 1-hydroxycyclohexylphenyl ketone (E-3) | | | 1 | | | 1 | | | |
| | 2-hydroxy-1-[4-[4-(2-hydroxy-2-methyl-propionyl)-benzyl]-phenyl]-2-methyl-propane-1-one (E-4) | | | 1 | 1 | | | | 1 | |
| Slip agent (D) | Polyether-modified polydimethyl siloxane (D1-1) | | | | | | | 1 | | |
| | Polyether-modified polydimethyl siloxane (D1-2) | | | 1.2 | | 1 | | | 1 | |
| | Acrylate of polyether-modified polydimethyl siloxane (D1-3) | | 1 | 1 | | | | | | |
| | Perfluoroalkyl ethylene oxide adduct (D2-1) | | | | | | | 1 | | |
| | Fluoro group-containing acryloyl-modified oligomer (D2-2) | | | | | | | | | 1 |
| Monomer (B) | Hexaacrylate of ε-caprolactone (12 mol) adduct of dipentaerythritol (B-1) | 26 | | | | | | | | |
| Antistatic agent (G) | Lithium salt of trifluoro methanesulfonyl imide (G-1) | | | | 1 | | | 1 | | 1 |
| | Polymer-lithium salt (G-2) | | | | | | 1 | | | |
| | Polymer-lithium salt (G-3) | | | | | 1 | | | | |
| Comparative monomer | Dicyclopentadiene diacrylate (C'-1) | 200 | | | | | | | | |
| | Dynamic friction coefficient | | 0.30 | 0.33 | 0.29 | 0.30 | 0.29 | 0.31 | 0.28 | 0.29 |
| | Loss modulus E" (Pa) | | $7 \times 10^6$ | $3 \times 10^7$ | $1 \times 10^7$ | $1 \times 10^7$ | $5 \times 10^7$ | $2 \times 10^7$ | $7 \times 10^6$ | $2 \times 10^7$ |
| Performance evaluation | Damage restoration | | ○ | ○ | ○ | ○ | ○ | ○ | ○ | ○ |
| | Adhesion | | ○ | ○ | ○ | ○ | ○ | ○ | ○ | ○ |
| | Transparency | | 0.4 | 0.7 | 0.4 | 0.3 | 0.6 | 0.3 | 0.3 | 0.9 |

| | | | Tg | Example | | | Comparative Example | | |
|---|---|---|---|---|---|---|---|---|---|
| | | | (° C.) | 17 | 18 | 19 | 1 | 2 | 3 |
| Amount (part by weight) | Monomer (A) | Dipentaerythritol hexaacrylate (A-1) | 200 or more | | 30 | 40 | | | 50 |
| | | Pentaerythritol tetraacrylate (A-2) | 200 or more | | | | 40 | | |
| | | Trimethylolpropane triacrylate(A-3) | 200 or more | | | | | | |
| | | Bisphenoxyfluorene diacrylate (A-4) | 211 | | | | | | |
| | | Trimethylolpropane trivinyl ether (A-5) | 200 or more | 30 | | | | | |

TABLE 1-continued

| | | Tg | | | | | | |
|---|---|---|---|---|---|---|---|---|
| Monomer (C) | Polyethylene glycol diacrylate (C-1) | −20 | | | 50 | 60 | | |
| | Triacrylate of EO (15 mol) adduct of trimethylolpropane (C-2) | −22 | 20 | | | | | |
| | Diacrylate of EO (20 mol) adduct of bisphenol A (C-3) | −30 | | | | | | |
| | Tetraacrylate of EO (35 mol) adduct of pentaerythritol (C-4) | −30 | | | | | | |
| | Triacrylate of EO (9 mol) adduct of trimethylolpropane (C-5) | −20 | 50 | | | | | |
| | Diacrylate of EO (10 mol) adduct of bisphenol A (C-6) | −20 | | | | | | |
| | Polyethylene glycol divinyl ether (C-7) | −25 | | 70 | | | | |
| Photopolymerization initiator (E) | 2,4,6-trimethyl benzoyl diphenylphosphine oxide (E-1) | | 1 | 1 | | | 1 | 1 |
| | Bis(2,4,6-trimethyl benzoyl) phenylphosphine oxide (E-2) | | | 1 | 1 | 1 | | |
| | 1-hydroxycyclohexylphenyl ketone (E-3) | | 1 | | | | | 1 |
| | 2-hydroxy-1-{4-[4-(2-hydroxy-2-methyl-propionyl)-benzyl]-phenyl}-2-methyl-propane-1-one (E-4) | | | | | | | |
| Slip agent (D) | Polyether-modified polydimethyl siloxane (D1-1) | | | | | 1 | 1 | 1 |
| | Polyether-modified polydimethyl siloxane (D1-2) | | | | | | | |
| | Acrylate of polyether-modified polydimethyl siloxane (D1-3) | | 1 | | | | | |
| | Perfluoroalkyl ethylene oxide adduct (D2-1) | | | | | | | |
| | Fluoro group-containing acryloyl-modified oligomer (D2-2) | | | | 1 | | | |
| Monomer (B) | Hexaacrylate of ε-caprolactone (12 mol) adduct of dipentaerythritol (B-1) | 26 | | | 10 | 20 | 40 | 50 |
| Antistatic agent (G) | Lithium salt of trifluoro methanesulfonyl imide (G-1) | | | | | 1 | 1 | 1 |
| | Polymer-lithium salt (G-2) | | 1 | | 1 | | | |
| | Polymer-lithium salt (G-3) | | | | 1 | | | |
| Comparative monomer | Dicyclopentadiene diacrylate (C'-1) | 200 | | | | 40 | | |
| | Dynamic friction coefficient | | 0.30 | 0.29 | 0.69 | 0.31 | 0.32 | 0.32 |
| | Loss modulus E" (Pa) | | $3 \times 10^7$ | $3 \times 10^7$ | $5 \times 10^7$ | $9 \times 10^6$ | $1 \times 10^6$ | $1 \times 10^6$ |
| Performance evaluation | Damage restoration | | ○ | ○ | Δ | x | ○ | x |
| | Adhesion | | ○ | ○ | ○ | ○ | ○ | ○ |
| | Transparency | | 0.7 | 0.4 | 0.4 | 0.4 | 3.1 | 0.3 |

No Tg was observed in the homopolymers of the monomers (A-1) to (A-3), and (A-5). Each homopolymer has a decomposition temperature of 200° C. or higher. Since the decomposition temperature can be regarded as Tg, the homopolymers of the monomers (A-1) to (A-3), and (A-5) were regarded to have a Tg of 200° C. or higher.

Symbols of compounds in Table 1 represent the following compounds.

(A-1): Dipentaerythritol hexaacrylate (trade name "KAYARAD DPHA", produced by Nippon Kayaku Co., Ltd.)
(A-2): Pentaerythritol tetraacrylate (trade name "NEOMER EA-300", produced by Sanyo Chemical Industries, Ltd.)
(A-3): Trimethylolpropane triacrylate (trade name "SR-350", produced by ARKEMA K.K.)
(A-4): Bisphenoxyfluorene diacrylate (trade name "A-BPEF", produced by SHIN-NAKAMURA CHEMICAL CO., LTD.)
(A-5): Trimethylolpropane trivinyl ether (produced by NIPPON CARBIDE INDUSTRIES CO., INC.)
(B-1): Hexaacrylate of a ε-caprolactone (12 mol) adduct of dipentaerythritol (trade name "KAYARAD DPCA-120", produced by Nippon Kayaku Co., Ltd.)
(C-1): Polyethylene glycol diacrylate (trade name "Light acrylate 9EG-A", produced by Kyoeisha Chemical Co., Ltd.)
(C-2): Triacrylate of an EO (15 mol) adduct of trimethylolpropane (trade name "SR-9035", produced by ARKEMA K.K.)
(C-3): Diacrylate of an EO (20 mol) adduct of bisphenol A (trade name "NEW FRONTIER BPE-20", produced by DAI-ICHI KOGYO SEIYAKU CO., LTD.)
(C-4): Tetraacrylate of an EO (35 mol) adduct of pentaerythritol (trade name "ATM-35E", produced by SHIN-NAKAMURA CHEMICAL CO., LTD.)

(C-5): Triacrylate of an EO (9 mol) adduct of trimethylolpropane (trade name "SR-502", produced by ARKEMA K.K.)
(C-6): Diacrylate of an EO (10 mol) adduct of bisphenol A (trade name "SR-480", produced by ARKEMA K.K.)
(C-7): Polyethylene glycol divinyl ether (trade name "TDVE", produced by Maruzen Petrochemical Co., Ltd.)
(C'-1): Dicyclopentadiene diacrylate (trade name "Light acrylate DCP-A", produced by Kyoeisha Chemical Co., Ltd.)

Table 1 shows glass transition temperatures (Tgs) of the homopolymers of the above monomers.

(D1-1): Polyether-modified polydimethyl siloxane (trade name "BYK-333", produced by BYK Japan KK., SP value 8.7)
(D1-2): Polyether-modified polydimethyl siloxane (trade name "BYK-349", produced by BYK Japan KK., SP value 8.4)
(D1-3): Acrylate of polyether-modified polydimethyl siloxane (trade name "BYK-UV3500", produced by BYK Japan KK., SP value 8.5)
(D2-1): Perfluoroalkyl ethylene oxide adduct (trade name "F-444", produced by DIC)
(D2-2): Fluoro group-containing acryloyl-modified oligomer (trade name "RS-75", produced by DIC)
(E-1): 2,4,6-trimethylbenzoyldiphenylphosphine oxide (trade name "Lucirin TPO", produced by BASF)
(E-2): Bis(2,4,6-trimethylbenzoyl)phenylphosphine oxide (trade name "IRGACURE 819", produced by BASF)
(E-3): 1-hydroxycyclohexylphenyl ketone (trade name "IRGACURE 184", produced by BASF)
(E-4): 2-hydroxy-1-{4-[4-(2-hydroxy-2-methyl-propionyl)-benzyl]-phenyl}-2-methyl-propane-1-one (trade name "IRGACURE 127", produced by BASF)
(G-1): Lithium salt of trifluoromethanesulfonyl imide (trade name "Sankonol A600-50R", produced by Sanko Chemical Industry Co., Ltd.)
(G-2): Polymer-lithium salt (trade name "PC-686", produced by MARUBISHI OIL CHEMICAL CO., LTD.)
(G-3): Polymer-lithium salt (trade name "PC-3662", produced by MARUBISHI OIL CHEMICAL CO., LTD.)

<Glass Transition Temperature (Tg) of Homopolymer>
<Preparation of Test Piece>

To a monomer was added 1-hydroxycyclohexylphenyl ketone (trade name "IRGACURE 184", produced by BASF) as an initiator in an amount of 3% by weight based on the amount of the monomer, and the monomer was cured by irradiation with 1000 mJ/cm$^2$ of ultraviolet light using an ultraviolet irradiation apparatus. Thus, a test piece with a size of 40 mm in length, 5 mm in width, and 1 mm in thickness was prepared.

<Method of Measuring Dynamic Viscoelasticity>

Measurement was performed using the test piece by a dynamic viscoelasticity measurement apparatus, Rheogel-E4000, which is produced by UBM, under the conditions of frequency: 10 Hz, temperature rise rate: 4° C./min.

The maximum value of Tg measurable by the present measurement method is 400° C.

For each of the active energy ray-curable compositions of the present invention and active energy ray-curable compositions for comparison, dynamic friction coefficient, damage restoration, adhesion, and total light transmittance of cured products were measured in the following way.

Table 1 shows the results.

<Preparation of Test Piece>

An active energy ray-curable composition was applied to one surface of a glass plate with an applicator to have a thickness of 100 μm, a polyester film having a thickness of 100 μm was adhered to the resin-side, and the polyester film was pressed by running a roller thereon so that air was forced out. The composition was cured by 1000 mJ/cm$^2$ of UV light applied from the polyester film-side using a UV irradiation device. The cured product closely adhered to the PET film was separated from the glass plate to give a test piece.

<Dynamic Friction Coefficient>

Measurement was performed in accordance with ASTM D1894 using a surface property tester (trade name "TRIBOGEAR TYPE: 14FW", produced by Shinto Scientific Co., Ltd.). The measurement was performed by the following procedures.

(1) A cured product (the above test piece) was placed on a pedestal of a surface property tester with a cured film face upward, and a cured film was fixed thereto with a cellophane tape.
(2) An attachment stainless steel plate was attached to a lower part of a rod of the surface property tester, the plate was placed on the surface of the cured film, and a weight of 200 g was put on an upper portion of the rod.
(3) The dynamic friction coefficient of the surface of the cured film against the stainless steel plate was measured by moving the pedestal to which the test piece was fixed at a rate of 200 mm/min.

Measurement of Loss Modulus E"

The loss modulus E" at 25° C. was measured under the conditions of frequency: 10 Hz, temperature rise rate: 4° C./min using a dynamic viscoelasticity measurement apparatus, Rheogel-E4000, which was produced by UBM.

<Evaluation of Damage Restoration>

(1) A stainless-steel mold with fine irregularities that were formed from parallel lines with a groove depth of 50 μm and a pitch of 20 μm was prepared.
(2) An active energy ray-curable composition was applied to one surface of the metal mold with an applicator to have a thickness of 100 μm, a polyester film (trade name "COSMOSHINE A4300", produced by TOYOBO CO., LTD.) having a thickness of 100 μm was adhered to the resin-side, and the polyester film was pressed by running a roller thereon so that air was forced out. The composition was cured by 1000 mJ/cm$^2$ of UV light applied from the polyester film side using a UV irradiation device (model No. "VPS/I600", produced by Fusion UV Systems) to prepare a cured film.
(3) The surface of the cured film was subjected to a scratch test using a pencil with a chromium cap in accordance with JIS K 5600-5-4.
(4) The cured film was allowed to stand for 10 minutes, and then visually observed and evaluated as follows: a film on which scratches completely disappear was evaluated as good (o), a film on which some scratches were left was evaluated as fair (Δ), a film on which all scratches were left was evaluated as bad (x).

<Evaluation of Adhesion>

The test piece was allowed to stand under an atmosphere at 23° C. and a relative humidity of 50% for 24 hours, and then a 10×10 grid was made by making 1-mm squares on the test piece by cutting it using a cutter knife, in accordance with JIS K 5600-5-6. A cellophane adhesive tape was adhered to the grid, and a 90° peel test was performed. The separation of the cured product from the PET film was visually observed, and evaluated.

Evaluation was performed based on the following criteria.

Good (o): 90 squares or more out of 100 squares of the grid remain unseparated from the base.

Fair (Δ): 10 to 89 squares out of 100 squares of the grid remain unseparated from the base.

Bad (x): 9 squares or less out of 100 squares of the grid remain unseparated from the base.

<Evaluation of Transparency of Cured Product>

The total light transmittance (%) of the test piece was measured using a total light transmittance measurement device (trade name "haze-garddual", produced by BYK gardner) in accordance with JIS K 7105.

The results shown in Table 1 indicate that cured films of the active energy ray-curable compositions for optical components of the present invention are all excellent in damage restoration, adhesion, transparency of the cured products.

On the other hand, in Comparative Examples 1 and 3, since no di- or higher functional (meth)acrylate (C) is contained, damage restoration is poor.

Further, in Comparative Example 2 free from the di- or higher functional (meth)acrylate (A) with the above glass transition temperature of higher than 200° C., transparency is poor.

INDUSTRIAL APPLICABILITY

The cured product of the present invention of the active energy ray-curable composition for optical components of the present invention is excellent in damage restoration, adhesion to a base, and transparency, and therefore useful for optical components, or electric/electronic components. Further, an optical component formed from the cured product of the present invention is useful as optical lenses (e.g. prism lenses, lenticular lenses, microlenses, Fresnel lenses, lenses for improving viewing angle), sheets or films for optical lenses (optical compensation films, phase difference films), prisms, optical fibers, solder resists for flexible printed wiring, plating resists, interlayer insulating films for multilayer printed wiring board, or photosensitive optical waveguides.

The invention claimed is:

1. An active energy ray-curable composition for optical components, wherein the composition is composition (I) or composition (II), the composition (I) comprising:

a monomer (A) having 2 or more radical-polymerizable reactive groups (x1), wherein the homopolymer of the monomer (A) has a glass transition temperature of higher than 200° C.;

a monomer (B) having 2 or more radical-polymerizable reactive groups (x3), wherein the homopolymer of the monomer (B) has a glass transition temperature of −15° C. or higher and 100° C. or lower, wherein the monomer (B) comprises a (meth)acrylate having 2 to 6 radical-polymerizable reactive groups (x3) and in a molecule, 1 to 15 organic groups (b) represented by the following formula (5):

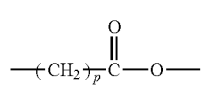

wherein p represents 4 or 5;

a monomer (C) having 2 or more radical-polymerizable reactive groups (x2), wherein the homopolymer of the monomer (C) has a glass transition temperature of lower than −15° C., wherein the monomer (C) comprises a polyfunctional (meth)acrylate represented by the following formula (1):

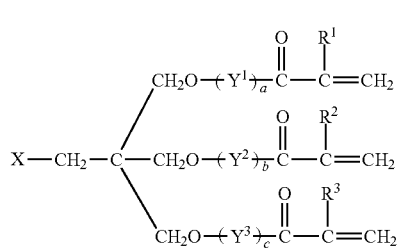

wherein X represents a hydroxyl group, a methyl group, a (meth)acryloyloxy group, a group represented by the formula (2), or a group represented by the formula (3):

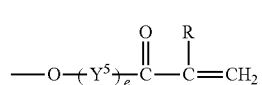

$R^1$ to $R^3$ and R each represent a hydrogen atom or a methyl group and may be the same as or different from one another, $Y^1$ to $Y^5$ each represent a C2-C4 oxyalkylene group and may be the same as or different from one another, and a, b, c, d, and e independently represent an integer of 0 to 10, provided that a+b+c+d+e is 6 to 40, and/or a bifunctional (meth)acrylate represented by the following formula (4):

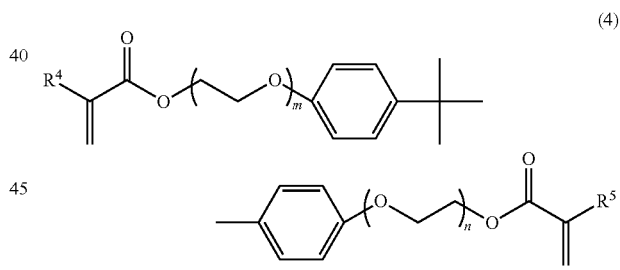

wherein $R^4$ and $R^5$ independently represent a hydrogen atom or a methyl group, and m and n independently represent an integer of 3 to 10;

a slip agent (D); and a photopolymerization initiator (E), wherein the photopolymerization initiator (E) comprises a phosphine oxide compound (E1) and/or a hydroxy benzoyl compound (E5), wherein the radical-polymerizable reactive groups (x1), (x2) and (x3) are each at least one group selected from the group consisting of an acrylate group and a methacrylate group, wherein the composition contains 41% to 59% by weight of the monomer (A) and 41% to 59% by weight of the monomer (C) based on the total weight of the monomers (A) and (C), 15% to 20% by weight of the monomer (B) based on the total weight of the monomers (A), (B), and (C), 0.8 to 5% by weight of the slip agent (D) based on the total weight of the monomers (A) and (C), and 1 to 8% by weight of the photopolymerization initiator (E) based on the total weight of the monomers (A) and (C); and the composition (II) comprising:

a monomer (A) having 2 or more radical-polymerizable reactive groups (x1), wherein the homopolymer of the monomer (A) has a glass transition temperature of higher than 200° C.;

a monomer (C) having 2 or more radical-polymerizable reactive groups (x2), wherein the homopolymer of the monomer (C) has a glass transition temperature of lower than −15° C., wherein the monomer (C) comprises a polyfunctional (meth)acrylate represented by the above formula (1) and a bifunctional (meth)acrylate represented by the above formula (4); and a slip agent (D); and a photopolymerization initiator (E), wherein the photopolymerization initiator (E) comprises a phosphine oxide compound (E1) and/or a hydroxy benzoyl compound (E5), wherein the radical-polymerizable reactive groups (x1) and (x2) are each at least one group selected from the group consisting of an acrylate group and a methacrylate group, wherein the composition contains 9% to 40% by weight of the monomer (A) and 60 to 91% by weight of the monomer (C) based on the total weight of the monomers (A) and (C), 20% to 60% by weight of the polyfunctional (meth)acrylate represented by the above formula (1) and 30% to 55% by weight of the bifunctional (meth)acrylate represented by the above formula (4) based on the total weight of the monomers (A) and (C), 0.8 to 5% by weight of the slip agent (D) based on the total weight of the monomers (A) and (C), and 1 to 8% by weight of the photopolymerization initiator (E) based on the total weight of the monomers (A) and (C).

2. The composition according to claim 1, wherein the radical-polymerizable reactive groups (x1) and (x2) are each an acrylate group.

3. The composition according to claim 1, wherein the monomer (A) has 4 to 6 radical-polymerizable reactive groups (x1) and further has 0 to 5 oxyalkylene groups.

4. The composition according to claim 1, wherein the slip agent (D) is at least one of a silicon-based slip agent (D1) and a fluorine-based slip agent (D2).

5. The composition according to claim 1, wherein the slip agent (D) has 2 to 100 oxyalkylene groups in a molecule.

6. The composition according to claim 1, wherein the radical-polymerizable reactive group (x3) is an acrylate group.

7. A cured product prepared by curing the active energy ray-curable composition for optical components according to claim 1 by irradiation with active energy rays.

8. The cured product according to claim 7, wherein the cured product has a dynamic friction coefficient of 0.05 to 0.5.

9. The cured product according to claim 7, wherein the cured product has a loss modulus E" of $5 \times 10^7$ Pa or lower.

10. An optical lens, a sheet for optical lenses, or a film for optical lenses, comprising the cured product according to claim 7.

11. The composition according to claim 1, wherein the monomer (A) has 4 or more radical-polymerizable reactive groups (x1).

12. The composition according to claim 1, wherein the monomer (A) is at least one selected from the group consisting of dipentaerythritol hexa(meth)acrylate, dipentaerythritol penta(meth)acrylate, pentaerythritol tetra(meth)acrylate, trimethylolpropane tri(meth)acrylate and bisphenoxyfluorene diacrylate, the monomer (B) is a hexaacrylate of a ε-caprolactone (1-15 mol) adduct of dipentaerythritol, and the polyfunctional (meth)acrylate represented by the above formula (1) is a compound represented by the above formula (1), wherein the X represents a methyl group, or a group represented by the formula (3), wherein the $Y^1$ to $Y^3$ and $Y^5$ each represent a C2 oxyalkylene group.

13. The composition according to claim 12, wherein the monomer (B) is a hexaacrylate of a ε-caprolactone (12 mol) adduct of dipentaerythritol.

\* \* \* \* \*